US009258978B2

(12) United States Patent
Link et al.

(10) Patent No.: US 9,258,978 B2
(45) Date of Patent: Feb. 16, 2016

(54) ANIMAL ENCLOSURE TRAY LOCK

(71) Applicant: Precision Pet Products, Inc., Costa Mesa, CA (US)

(72) Inventors: David Link, Costa Mesa, CA (US); Hongkun Liang, Zhongshan (CN)

(73) Assignee: Precision Pet Products, Inc., Costa Mesa, CA (US)

( * ) Notice: Subject to any disclaimer, the term of this patent is extended or adjusted under 35 U.S.C. 154(b) by 0 days.

(21) Appl. No.: 14/701,068

(22) Filed: Apr. 30, 2015

(65) Prior Publication Data
US 2016/0014992 A1    Jan. 21, 2016

Related U.S. Application Data

(60) Provisional application No. 62/027,055, filed on Jul. 21, 2014.

(51) Int. Cl.
*A01K 1/015* (2006.01)
*A01K 1/03* (2006.01)
*A01K 1/10* (2006.01)

(52) U.S. Cl.
CPC ................. *A01K 1/015* (2013.01); *A01K 1/034* (2013.01); *A01K 1/105* (2013.01)

(58) Field of Classification Search
CPC ..... A01K 1/00; A01K 1/0236; A01K 1/0245; A01K 1/03; A01K 1/031–1/035; A01K 1/0356; A01K 1/10; A01K 1/105; A01K 31/04
See application file for complete search history.

(56) References Cited

U.S. PATENT DOCUMENTS

| | | | | |
|---|---|---|---|---|
| 2,030,077 A | * | 2/1936 | Skiles | A01K 1/035 119/462 |
| 2,725,036 A | * | 11/1955 | Petrie | A01K 1/03 119/472 |
| 3,742,909 A | * | 7/1973 | Yellin | A01K 1/03 119/479 |
| 3,862,620 A | * | 1/1975 | Bernhard et al. | A01K 1/03 119/481 |
| 3,896,766 A | | 7/1975 | Martin | |
| 4,016,833 A | | 4/1977 | Ray | |
| 4,140,080 A | | 2/1979 | Snader | |
| 4,527,512 A | | 7/1985 | Sugiura | |
| 4,574,738 A | * | 3/1986 | Tominaga | A01K 39/012 119/464 |
| 4,590,885 A | | 5/1986 | Sugiura | |
| 4,762,085 A | | 8/1988 | Ondrasik | |
| 4,763,606 A | | 8/1988 | Ondrasik | |
| 4,917,047 A | | 4/1990 | Wazeter, III | |
| 5,097,796 A | | 3/1992 | Reimers | |
| 5,233,939 A | | 8/1993 | Randolph | |
| 5,335,618 A | | 8/1994 | Zarola | |
| 5,482,005 A | | 1/1996 | Thom | |
| 5,544,619 A | | 8/1996 | Braun | |
| 5,549,073 A | | 8/1996 | Askins et al. | |
| 5,626,098 A | | 5/1997 | Askins et al. | |

(Continued)

*Primary Examiner* — Monica Williams
*Assistant Examiner* — Christopher Hutchens
(74) *Attorney, Agent, or Firm* — Stetina Brunda Garred & Brucker

(57) ABSTRACT

A tray lock mechanism for a pet enclosure is disclosed. The tray lock mechanism includes a sliding component that has a camming surface that interacts with a leading-edge of the tray to generate an upward force to move the sliding component out of the way so that the tray can be inserted into an opening and into the pet enclosure. Additionally, in a further embodiment, the tray lock mechanism contemplates a door extension that extends downward and blocks the opening when the door is in the closed position and unblocks the opening when the door is in an opened position.

7 Claims, 6 Drawing Sheets

(56) References Cited

U.S. PATENT DOCUMENTS

| | | |
|---|---|---|
| 5,653,194 A | 8/1997 | Guy |
| 5,752,470 A | 5/1998 | Koneke |
| 5,950,568 A | 9/1999 | Axelrod et al. |
| 5,967,089 A | 10/1999 | Allen |
| 6,092,488 A | 7/2000 | Allawas |
| 6,152,081 A | 11/2000 | Baker |
| 6,155,206 A | 12/2000 | Godshaw |
| 6,192,834 B1 | 2/2001 | Kolozsvari |
| 6,631,590 B1 | 10/2003 | Glowaski |
| 6,681,720 B1 * | 1/2004 | Skurdalsvold ........... A01K 1/03 119/461 |
| 6,883,463 B2 | 4/2005 | Link |
| 2008/0110412 A1 * | 5/2008 | Shimoda ................ A01K 1/034 119/473 |

* cited by examiner

ANIMAL ENCLOSURE TRAY LOCK

CROSS-REFERENCE TO RELATED APPLICATIONS

The present application claims priority to, and the benefit of, U.S. Provisional Application Ser. No. 62/027,055 entitled "Animal Enclosure Tray Lock" filed Jul. 21, 2014, the disclosure of which is herein incorporated by reference in its entirety.

STATEMENT RE: FEDERALLY SPONSORED RESEARCH/DEVELOPMENT

Not Applicable

BACKGROUND

The various aspects and embodiments disclosed herein relate to a tray lock for an animal enclosure.

For a dog, an animal enclosure provides various essential benefits. Dogs are, by nature, den animals and feel secure in small, enclosed spaces. As such an animal enclosure provides such a space for the dog. Animal enclosures can also be used to avoid unfavorable dog behaviors such as house soiling, destructive chewing, digging, unnecessary barking and howling. Animal enclosures can also be used to transport the dog in a car and also to potty train the animal. Since the animal enclosure is considered a safe and relaxing atmosphere, the animal enclosure must be cleaned out regularly. To this end, animal enclosures are typically fitted with a removable tray that captures any liquid or solid excreted by the animal. Unfortunately, these removable trays are typically cumbersome to remove and replace.

Accordingly, there is a need in the art for an improved method and system for removing and replacing trays from an animal enclosure.

BRIEF SUMMARY

An animal enclosure with first and second embodiments of a tray lock mechanism is disclosed therein. In the first embodiment of the tray lock mechanism, the tray lock mechanism has a sliding component that through a camming action is traversed upward as the tray is inserted into an opening of the pet enclosure. In particular, the camming action involves a camming surface oriented at a skewed angle so that when a leading-edge of the tray contacts the camming surface, an upward force is created that traverses the sliding component upward and out of the opening so that the tray can be inserted into the opening and into the pet enclosure. To remove the tray from the pet enclosure, the user simply lifts the sliding component with his or her fingers and pulls the tray out of the pet enclosure through the opening. In the second embodiment of the tray lock mechanism, a door has a door extension that extends downward. When the door is in a closed position, the door extension blocks the opening of the pet enclosure used to insert or remove the tray from the pet enclosure. When the door is in an open position, the door extension is moved away from the opening of the pet enclosure so that the tray can now be inserted or removed from the pet enclosure through the opening. The door extension may be traversed away from the opening by lifting the entire door upward about its rotational axis or swinging the door fully opened.

More particularly, a pet enclosure is disclosed. The pet enclosure may comprise a tray, a plurality of panels and tray lock mechanism. The tray may have a rectangular configuration. An outer peripheral portion of the tray may be raised upward to retain any liquid within the peripheral portion of the tray. The plurality of panels may comprise top, bottom, front, rear, left and right panels arranged and attached to each other as an enclosure. A first wirerod of the bottom panel, a second wire rod of the front panel, a third wirerod of a left panel and a fourth wirerod of a right panel may form a tray opening for the insertion and removal of the tray into and out of the pet enclosure. The tray lock mechanism may be slidably disposed on the second wire rod of the front panel and a fifth wire rod of the front panel. The tray lock mechanism may be traversable between a down position wherein the tray lock mechanism is disposed in the opening and prohibits insertion or removal of the tray through the opening and an up position wherein the tray lock mechanism is traversed out of the opening to allow for the insertion or removal of the tray.

The tray lock mechanism may further have a sliding component defining a camming surface. The camming surface may be skewed with respect to a horizontal plane and a vertical plane to generate an upward force when the tray is pushed into the opening and a leading portion of the tray contacts the camming surface. The skew angle of the camming surface may be between zero degrees and ninety degrees. More preferably, the skew angle may be about 45 degrees.

The tray lock mechanism may be a wirerod bent into shape. The wirerod defines first left and right rods that are trapped within left and right loops of the fifth wirerod of the front panel. The left and right loops may be trapped between first and second left and right rods. The second wirerod of the front panel may be trapped between first and third left and right rods to guide the sliding component between up and down positions.

In another aspect, a method of inserting a pet tray into a pet enclosure is disclosed. The method may comprise the steps of traversing a sliding component of a tray lock mechanism disposed at a tray opening upward out of the opening with a camming action to permit entry of the pet tray through the opening and into the pet enclosure; pushing the pet tray trough the opening until the entire pet tray is disposed within the enclosure; and traversing the tray lock mechanism downward to prohibit removal of the pet tray from the pet enclosure out through the opening.

The traversing the sliding component upward step may comprise the step of pushing a leading edge of the pet tray into a skewed camming surface of the tray lock mechanism wherein the camming surface is angled to allow the leading edge of the pet tray to contact the camming surface of the sliding component to generate an upward force to traverse the sliding component of the tray lock mechanism upward. The camming surface may be between zero degrees and 90 degrees from horizontal and vertical planes. More preferably, the camming surface may be at about 45 degrees from the horizontal and vertical planes.

In another aspect, a pet enclosure is disclosed. The pet enclosure may comprise a tray, a plurality of panels and a door. The tray may have a rectangular configuration. An outer peripheral portion of the tray may be raised upward to retain any liquid within the peripheral portion of the tray. The plurality of panels may comprise top, bottom, front, rear, left and right panels arranged and attached to each other as an enclosure. A door opening may be formed in the front panel for allowing the pet to enter or exit the pet enclosure. The front panel may also have a tray opening at a lower portion of the front panel to allow for the insertion and removal of the tray into and out of the pet enclosure. The door is rotateably traversable between a closed position to block the door opening and an opened position to allow the pet to pass through the door opening. The door may also have a door extension extending downward and positioned to block the tray opening when the door is in the closed position.

The door extension may be rotated away from the tray opening when the door is rotated to the opened position to insert or remove the tray through the tray opening. Additionally or alternatively, the door may be vertically traversable in the closed position to traverse the door extension away from the tray opening to allow for the insertion and removal of the tray into and out of the pet enclosure through the tray opening.

In another aspect, a method of inserting a pet tray into a pet enclosure is disclosed. The method may comprise the steps of traversing a door extension away from a tray opening of the pet enclosure; pushing the pet tray trough the tray opening until the entire pet tray is disposed within the pet enclosure; and traversing the door extension so as to block the tray opening to prohibit removal of the pet tray from the pet enclosure out through the opening.

In the method, the traversing step may comprise the step of rotating the door to an opened position to unblock the tray opening. Additionally or alternatively, the traversing step may comprise the step of lifting the door and the door extension to unblock the tray opening.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
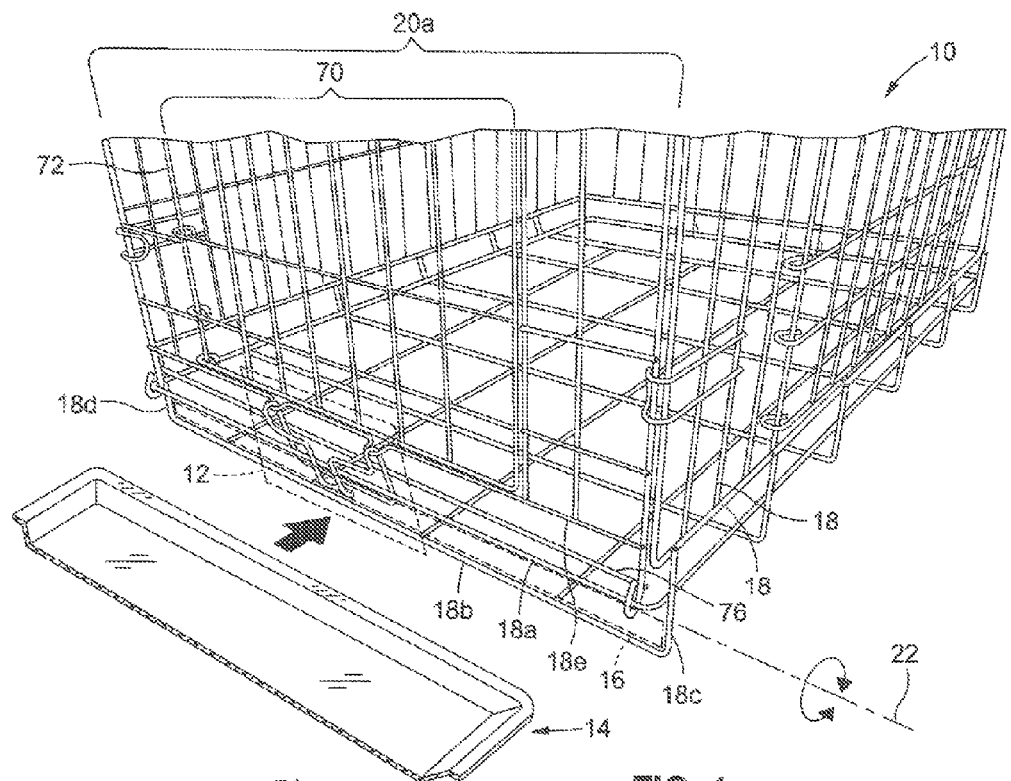
FIG. 1 is a perspective view of a pet enclosure having a first embodiment of a tray lock mechanism and tray.

Referring now to the drawings, a pet enclosure 10 with a tray lock mechanism 12 is shown. The tray lock mechanism 12 allows a tray 14 to be inserted into an opening 16 of the pet enclosure 10 by simply pushing the tray 14 into the opening 16. The tray lock mechanism 12 has a camming action to lift the tray lock mechanism 12 out of the way without having to lift it 12 with the person's finger so that the tray 14 can be easily inserted through the opening 16 and into the pet enclosure 10. Once the tray 14 is disposed within the pet enclosure 10, the tray lock mechanism 12 blocks the opening 16 to prevent inadvertent removal of the tray 14 from the pet enclosure 10. To remove the tray 14 from the pet enclosure 10, the tray lock mechanism 12 may be lifted upward with a person's finger to unblock the opening 16 and allow the person to slip the tray 14 out of the opening 16.

Referring now to FIG. 1, the pet enclosure 10 may be fabricated from a plurality of horizontal and vertical wire rods 18. The horizontal and vertical wire rods 18 may be fabricated to form six different panels, namely, a top panel (not shown), first—fourth side panels and a bottom panel. The first side panel 20a may be pivotable about axis 22. However, when the pet enclosure 10 is erect, the first side panel 20a does not pivot about pivot axis 22. Rather, the first side panel 20a remains stationary. The opening 16 for the tray 14 is defined by the wirerod 18a which defines the pivot axis 22. Wirerods 18a-d define the opening 16 for the tray 14. The tray 14 is smaller than the opening 16 so that the tray 14 may be pushed into and pulled out of the pet enclosure 10 through the opening 16.

Figure 3:
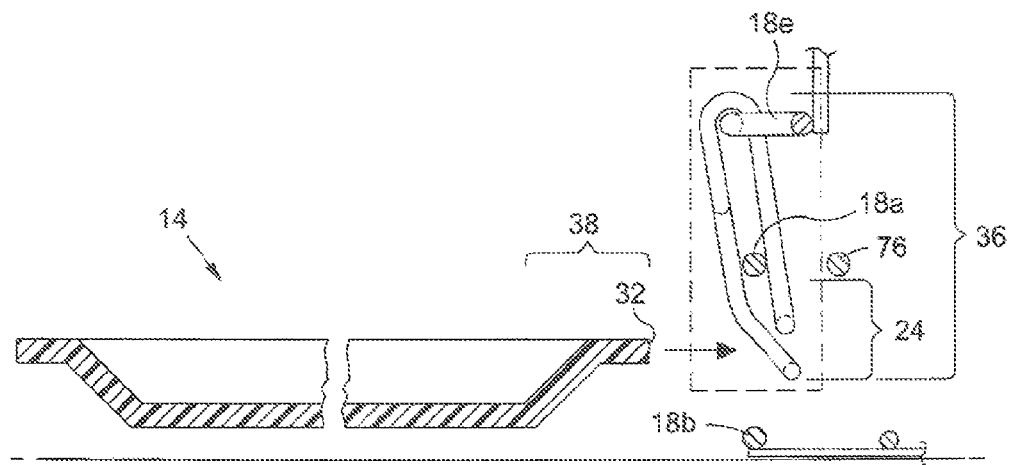
FIG. 3 is a side cross-sectional view of the first embodiment of the tray lock mechanism shown in FIG. 1 and the tray.
Figure 4:
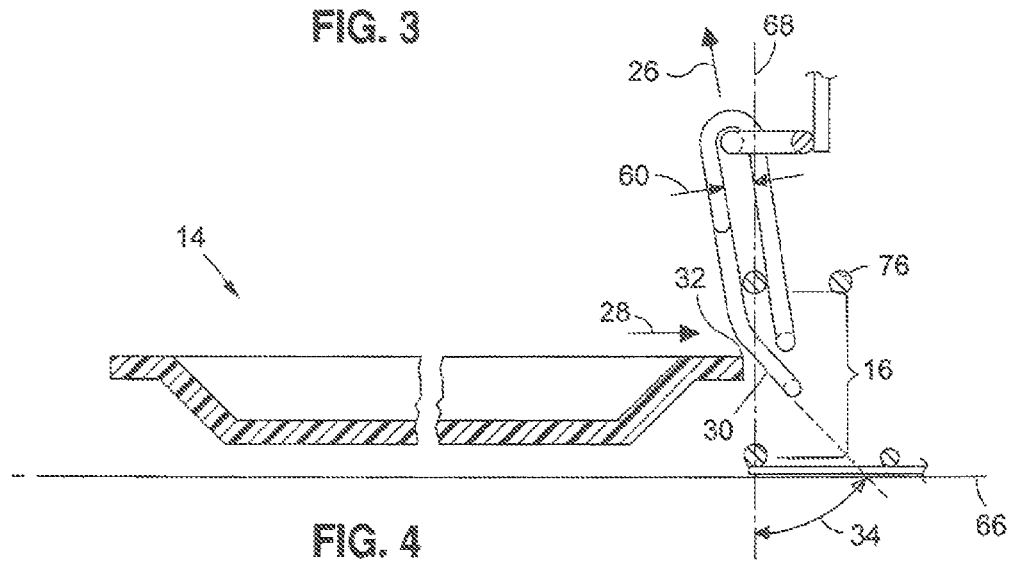
FIG. 4 illustrates the tray contacting a camming surface of the tray lock mechanism to traverse a sliding component of the tray lock mechanism upward.
Figure 5:
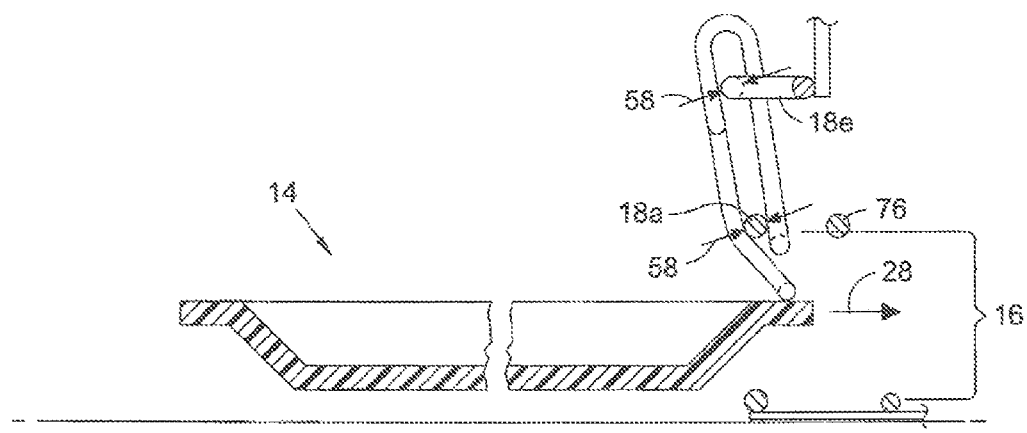
FIG. 5 illustrates the sliding component in an up position so that the tray can slide through an opening of the pet enclosure.
Figure 6:
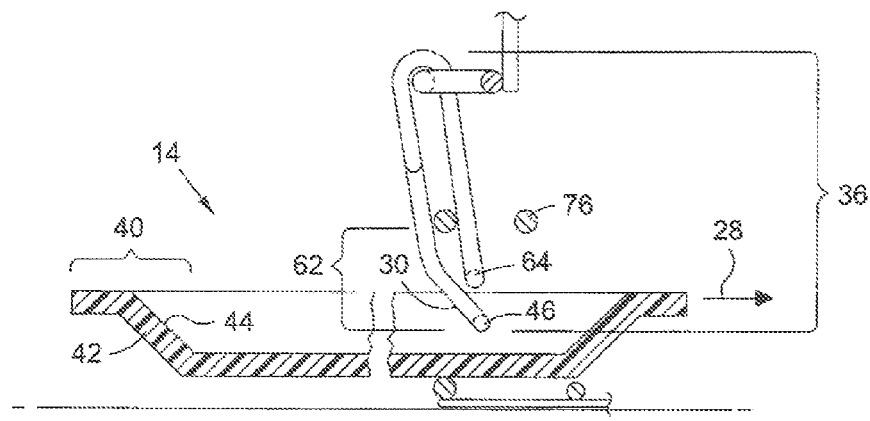
FIG. 6 illustrates the tray partially disposed within the pet enclosure.
Figure 7:
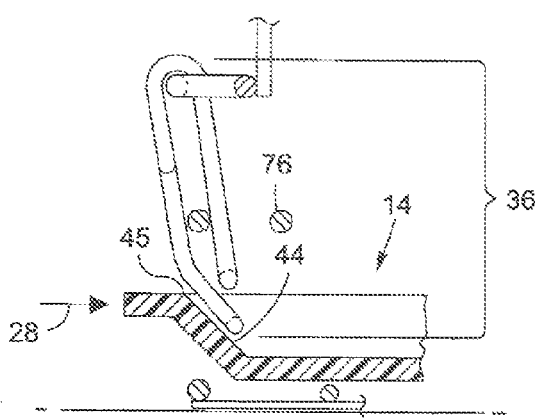
FIG. 7 illustrates a trailing portion of the tray causing the sliding component of the tray lock mechanism to traverse upward.
Figure 8:
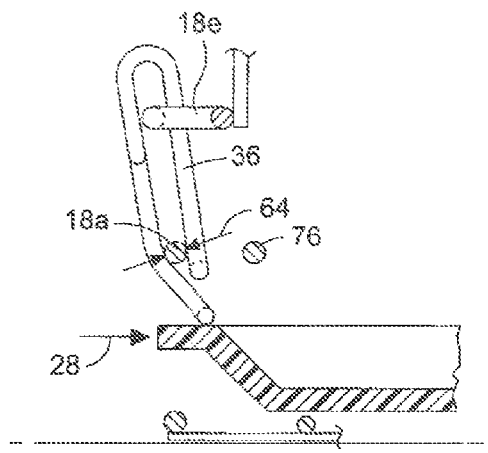
FIG. 8 illustrates the sliding component in an up position as the sliding component moves over the trailing portion of the tray.
Figure 9:
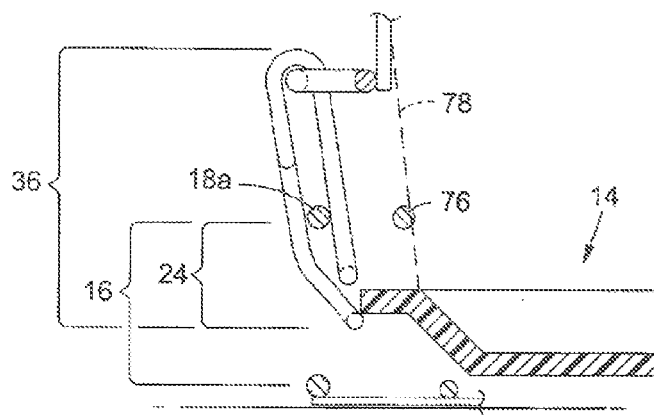
FIG. 9 illustrates the tray completely disposed within the pet enclosure and the sliding component of the tray lock mechanism disposed behind the tray to prevent inadvertent removal of the tray from the pet enclosure.

The tray lock mechanism 12 is biased to the down position as shown in FIGS. 3, 6 and 9. When the tray lock mechanism 12 is in the down position, the opening 16 is blocked by a bottom portion 24 of a sliding component 36 of the tray lock mechanism 12. The bottom portion 24 of a sliding component 36 of the sliding component 36 of the tray lock mechanism 12 is disposed within the opening 16 to prevent the tray 14 from being inadvertently removed through the opening 16. The sliding component 36 of the tray lock mechanism 12 may be traversed upward as shown by FIGS. 3-9 and arrow 26. In the up position shown in FIGS. 5 and 8, the tray 14 may be pushed into the pet enclosure 10 through the opening 16 in the direction of arrow 28.

To traverse the sliding component 36 of the tray lock mechanism 12 from the down position to the up position without having to lift it 12 up with one's finger, the tray lock mechanism 12 may have a camming surface 30 that contacts a leading-edge 32 of the tray 14 as the tray 14 is being pushed into the opening 16. The camming surface 30 is skewed from horizontal and vertical planes 66, 68 so that a force applied to the camming surface 30 in the direction of arrow 28 forms a vertical force in the upward direction to push the sliding component 36 of the tray lock mechanism 12 in the direction of arrow 26. The camming surface 30 may be at an angle 34. The angle 34 may be between 5° and 90°. However, the angle 34 is preferably at about 45°. In this manner, the vertical force is equal to the horizontal force used to push the tray 14 into the opening 16. The vertical force is greater than the weight of the sliding component 36 of the tray lock mechanism 12 and any friction between the sliding component 36 and the wirerods 18a, 18e.

After a leading portion 38 of the tray 14 has been pushed into the opening 16 as shown in FIG. 6, the tray 14 continues to slide forward until the sliding component 36 is pushed upward with the trailing portion 38 of the tray 14. In particular, the trailing portion 40 of the tray 14 may have a skewed sidewall 42. The sidewall 42 has a skewed camming surface 44 that contacts a distal end 46 of the sliding component 36. As the tray 14 is pushed in through the opening 16 in the direction of arrow 28, the skewed surface 44 creates a vertical force that pushes the sliding component 36 upward as shown in FIG. 8. The surface 44 is also skewed with respect to the horizontal and vertical planes 66, 68. Although the illustrations depict the camming surface 44 of the tray 14 creating the upward force to traverse the sliding component 36 upward, it is also contemplated that depending on the angle of the camming surface and the angle 34 of the camming surface 30, edge 45 (see FIG. 7) may contact the camming surface 30 before the distal end 46 of the sliding component 36 contacts the camming surface 44 so that the edge 45 and the camming surface 30 generates the upward force that pushes the sliding component to the raised or up position.

Figure 10:
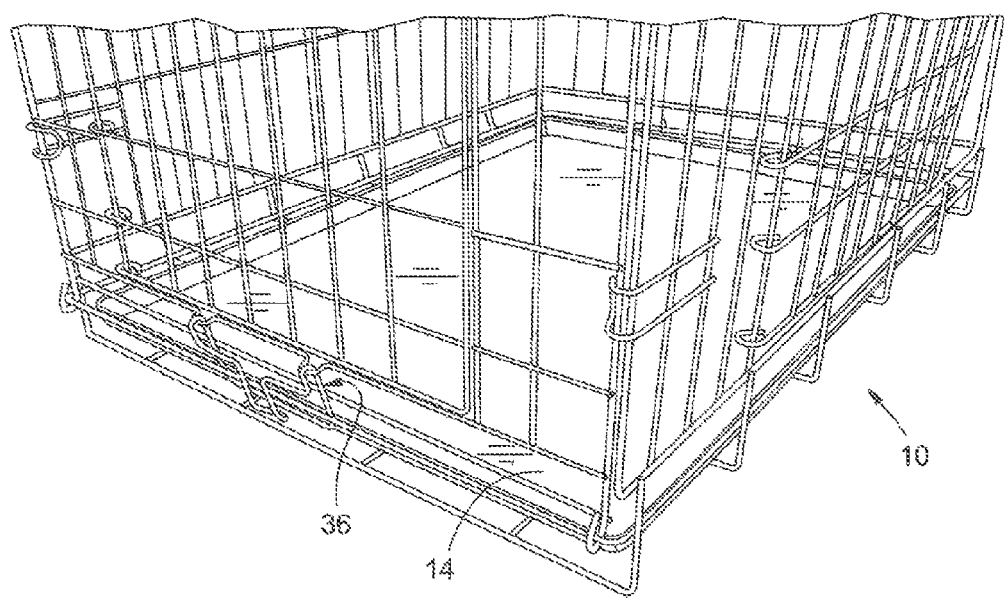
FIG. 10 is a perspective view of the pet enclosure with the tray disposed within the pet enclosure and the tray lock mechanism used to prevent inadvertent removal of the tray from the pet enclosure.

After the tray 14 is completely disposed within the pet enclosure 10 as shown in FIG. 9 the weight of the sliding component 36 forces the sliding component down. The bottom portion 24 of the sliding component 36 is disposed behind the tray 14 to prevent the tray 14 from slipping out of the pet enclosure 10 through the opening 16. A perspective view of the tray 14 disposed in the pet enclosure 10 with the sliding component 36 in the down position is shown in FIG. 10.

To prevent the pet from lifting up the sliding component 36, a wirerod 76 may be disposed behind the sliding component 36. The wirerod 76 may be attached to vertical wirerods of panel 20a. The wirerod 76 is positioned interior to the sliding component 36 so that the pet may not lift the sliding component 36 upward with his or her nose or paw. The wirerod 76 is preferably disposed at about the same elevation as the wirerod 18a. As a further alternative, in lieu of the wirerod 76, a wire mesh 78 may be disposed behind the sliding component 36 and attached to panel 20a. The wire mesh 78 may hang downward to prevent access to the sliding component 36 by the pet enclosed within the pet enclosure 10. The wire mesh 78 may extend across the entire width of the panel 20a or merely cover the sliding component 36 to prevent access to the sliding component 36 by the pet. A bottom end of the wire mesh 78 and the wirerod 76 may provide sufficient clearance for the tray 14 to be inserted and removed as discussed above but prevent access to the sliding component 36 by the pet within the pet enclosure 10.

Figure 2:
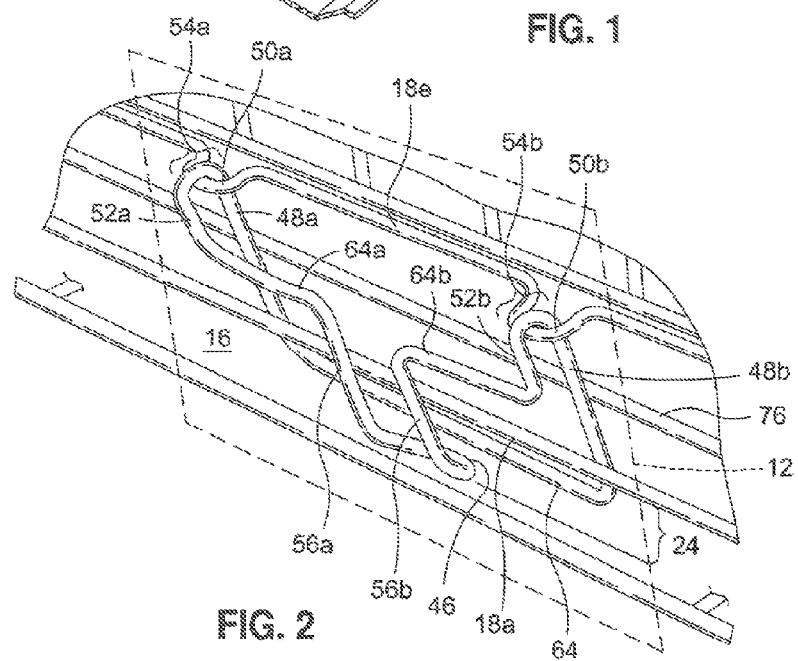
FIG. 2 is an enlarged perspective view of the first embodiment of the tray lock mechanism shown in FIG. 1.

Referring back to FIG. 2, the tray locking mechanism 12 may comprise the sliding component 36 that slides up-and-down to either allow the tray 14 to be pushed into or pulled out of the opening 16 formed in the pet enclosure 10. The tray lock mechanism 12 may also comprise wirerods 18a and 18d in addition to the sliding component 36 to guide the sliding component 36 between the up-and-down positions. The sliding component 36 may be fabricated from a wirerod and bent into the shape shown in FIG. 2.

The sliding component 36 may have elongate first rods 40a, b. These elongate first rods 48a, b are trapped between loops 50a, 50b. The interaction between the elongate first rods 48a, b and loops 50a, b prevent the sliding component 36 from moving left to right and allows the sliding component 36 to move up and down as shown in FIGS. 3-9.

The first rods 48a, b are connected to second rods 52a, b which are parallel to the first rods 48a, b. The first and second rods 48a b, 52a, b are connected to each other with loop portions 54a, b. The portions 54a, b hang on the loops 50a, b and define the down position of the sliding component 36. The first and second rods 48a, b and 52a, b limit front to back motion of the sliding component 36. Additionally, third rods 56a, b and the first rods 48a, b trap wirerod 18a therebetween. The distance 60 between the first wirerods 48a, b and the second and third rods 52a, b, 56a, b is greater than an outer diameter of the wirerods 18a, d so that the sliding component 36 is traversable between the up-and-down positions.

A lower portion 62 of the third wirerods 56a, b may be curved inward to form the angled camming surface 30. Moreover, the distance 64 between the lower portion 62 and a horizontal wirerod 64 that connects the first wirerods 48a, b may be smaller than the outer diameter 58 of the wire rods 18a, 18e so as to define the up position as shown in FIGS. 5 and 8.

As discussed above, the wirerod 76 or wire mesh 78 may be disposed behind the sliding component 36 to prohibit the pet disposed within the pet enclosure 10 from lifting up the sliding component 36 with his or her nose or paw.

To remove the tray 14 from the pet enclosure 10, the user may push up on two short horizontal wirerods 64a, b to traverse the sliding component to the up position. These wire rods 64a, b join the second and third wirerods 52a, b and 56a, b. By pushing up on these wirerods 64 a, b the sliding component 36 is traversed to the up position to unblock the opening 16. The user may grab the trailing portion 40 of the tray 14 and pull the tray 14 out of the pet enclosure 10 through the opening 16. The user continues to hold the sliding component 36 in the up position until the tray 14 is completely removed from the pet enclosure 10.

Figure 11:
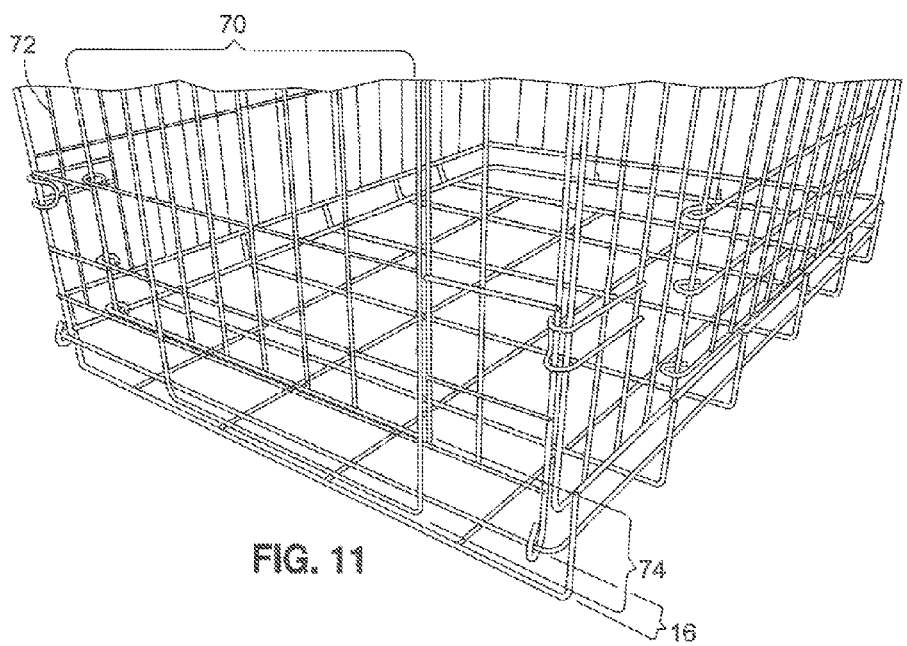
FIG. 11 is a perspective view of the pet enclosure with a second embodiment of the tray lock mechanism.
Figure 12:
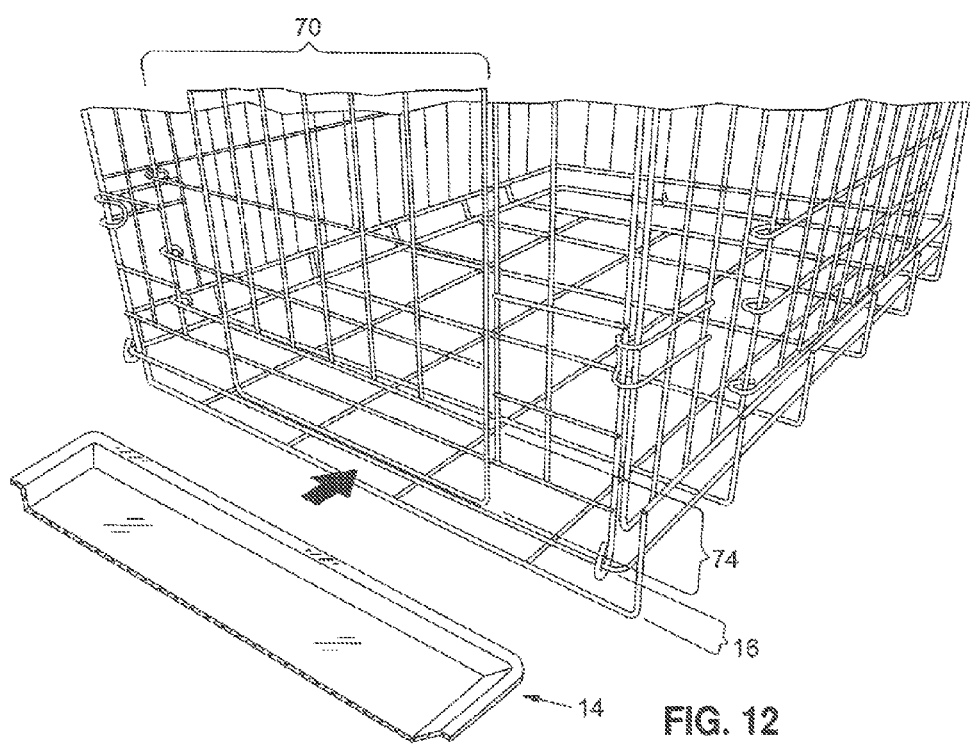
FIG. 12 is a perspective view of the pet enclosure illustrating a first means of traversing a door extension away from an opening of the pet enclosure used to insert or remove the tray from the pet enclosure.
Figure 12A:
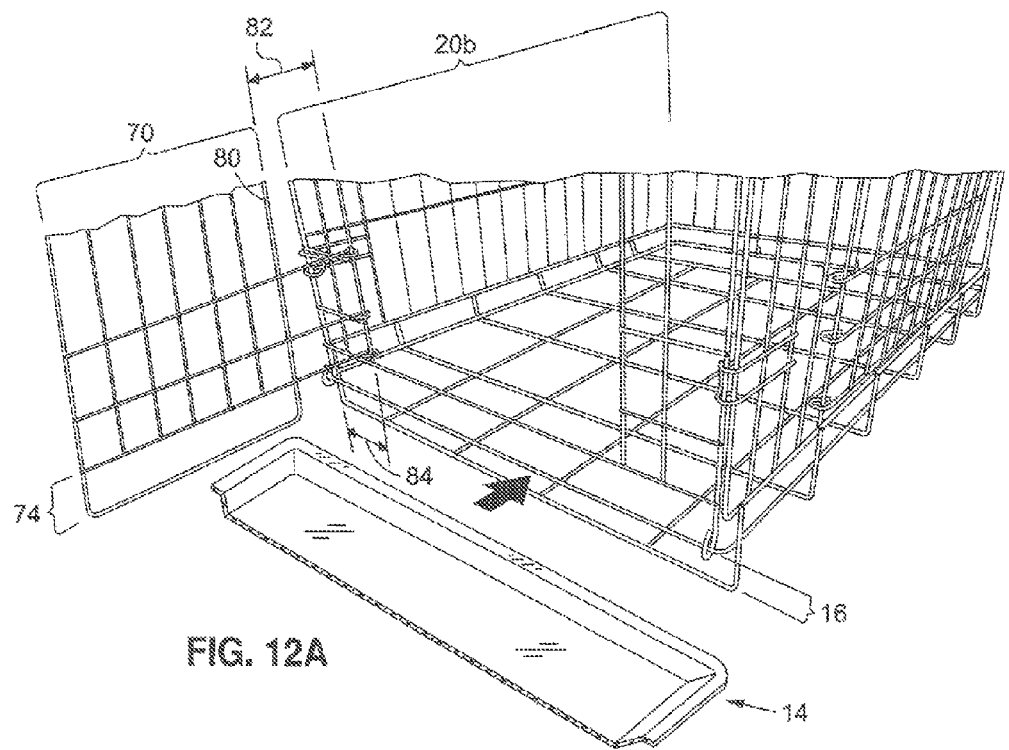
FIG. 12A is a perspective view of the pet enclosure illustrating a second means of traversing a door extension away from an opening of the pet enclosure used to insert or remove the tray from the pet enclosure.
Figure 13:
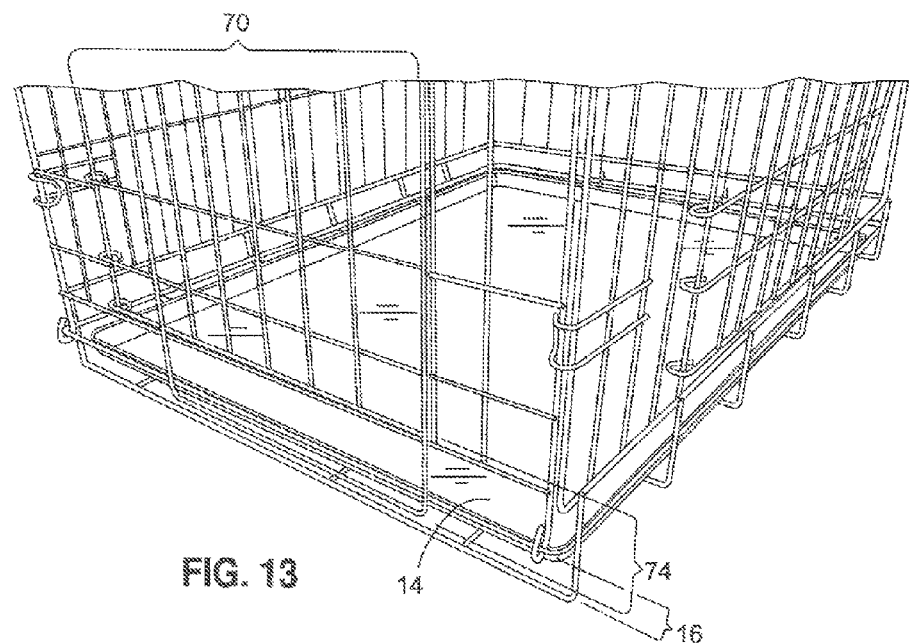
FIG. 13 is a perspective view of the pet enclosure with the tray completely disposed within the pet enclosure and the second embodiment of the tray lock mechanism used to prevent inadvertent removal of the tray from the pet enclosure.

In another embodiment, referring now to FIGS. 11-13, the first panel 20a may have a door 70 that can be traversed to the open or closed position by traversing the door about vertical wirerod 72. As shown in FIGS. 11, 12 and 13, the door 70 may be traversed up-and-down. In the down position shown in FIG. 11, the door 70 may have a bottom extension 74 that is disposed in front of the opening 16 when the door 70 is in the closed position. To insert the tray into the pet enclosure 10, the door 70 may be raised to the up position (see FIG. 12). In the raised position, the bottom extension 74 is displaced out of the opening 16 and allows the tray 14 to be inserted into the opening, as shown in FIG. 12. Once the tray 14 is fully inserted into the pet enclosure 10, the door 70 is traversed back to the down position, as shown in FIG. 13. In the down position, the bottom extension 74 blocks the opening 16 so that the tray 14 cannot be inadvertently removed from the pet enclosure 10. To remove the tray 14 from the pet enclosure 10, the user lifts the door 70 to the up position to unblock the opening 16 of the pet enclosure 10. Furthermore, the tray 14 is pulled out of the opening 16. Alternatively, as shown in in FIG. 12A, the door 70 can be swung open to traverse the door extension 74 out of the way of the opening 16 so that the tray 14 can be inserted or removed only when the door 70 is in the open position (see FIG. 12A). The door extension 74 defines a medial edge 80 which is a distance 82 to the vertical wirerod 72 about which the door 70 rotates. The vertical wirerod 72 is a distance 84 from the second panel 20b. The distance 82 is greater than the distance 84 so that the door extension 74 is traversed out of the way of the opening 16 when the door 70 is swung open. When the door 70 is swung open, then the door extension 74 is out of the way of the opening 16 so that the tray 14 can be inserted into the opening 16 and into the pet enclosure 10. When the door 70 is closed, the door extension 74 moves back into place and blocks the opening 16 so that the tray 14 cannot be removed through the opening.

The above description is given by way of example, and not limitation. Given the above disclosure, one skilled in the art could devise variations that are within the scope and spirit of the invention disclosed herein, including various ways of forming the opening 16. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A pet enclosure comprising:
   a tray for the pet enclosure, the tray having a rectangular configuration, an outer peripheral portion of the tray being raised upward to retain any liquid within the peripheral portion of the tray;
   top, bottom, front, rear, left and right panels arranged and attached to each other as an enclosure,
   a first wirerod of the bottom panel,
   a second wire rod of the front panel,
   a third wirerod of the left panel and a fourth wirerod of the right panel forming an opening for the insertion and removal of the tray into and out of the pet enclosure;
   a tray lock mechanism slidably disposed on the second wire rod of the front panel and a fifth wire rod of the front panel,
   the tray lock mechanism being traversable between a down position wherein the tray lock mechanism is disposed in the opening and prohibits insertion or removal of the tray through the opening and an up position wherein the tray lock mechanism is traversed out of the opening to allow for the insertion or removal of the tray,
   the tray lock mechanism further has a sliding component defining an angled surface that generates an upward force on the tray lock mechanism as the tray is pushed into the the tray lock mechanism and a leading portion of the tray contacts the angled surface of the tray lock mechanism.

2. The enclosure of claim 1 wherein a skew angle of the camming surface is between zero degrees and ninety degrees.

3. The enclosure of claim 2 wherein the skew angle is about 45 degrees.

4. The enclosure of claim 1 wherein the tray lock mechanism is a wirerod bent into shape.

5. The enclosure of claim 4, wherein the fifth wirerod defines first left and right rods that are trapped within left and right loops of the fifth wirerod of the front panel.

6. The enclosure of claim 5 wherein the left and right loops are trapped between first and second left and right rods.

7. The enclosure of claim 6 wherein the second wirerod of the front panel is trapped between first and third left and right rods to guide the sliding component between up and down positions.

* * * * *